United States Patent [19]
Zambon

[11] 3,760,927
[45] Sept. 25, 1973

[54] CONVEYING MACHINE WITH PROCESS SELECTOR

[75] Inventor: Giacomo R. Zambon, Warren, Mich.

[73] Assignee: The Udylite Corporation

[22] Filed: July 15, 1971

[21] Appl. No.: 162,934

[52] U.S. Cl. .................................................. 198/19
[51] Int. Cl. ............................................. B23q 5/22
[58] Field of Search .................... 198/19; 214/1 BB; 204/204

[56] References Cited
UNITED STATES PATENTS
3,270,855  9/1966  Harper et al. ......................... 198/19
2,605,882  8/1952  Curtis ................................... 198/19
FOREIGN PATENTS OR APPLICATIONS
726,526  1/1966  Canada ................................. 198/19

*Primary Examiner*—Evon C. Blunk
*Assistant Examiner*—Douglas D. Watts
*Attorney*—J. King Harness et al.

[57] ABSTRACT

A conveying machine for transporting workpieces through a series of work stations comprising a plurality of work carriers disposed at spaced intervals, each incorporating a vertically movable carriage thereon from which the workpieces are adapted to be suspended. Each work carrier is provided with a selector mechanism comprising a plurality of presettable levers that are adapted to coact with cams at certain of the work stations to effect an engagement and retention of the carriages of selected work carriers in a raised position at such stations, thereby providing for a preselected variation in the processing cycle to which the workpieces on successive work carriers are subjected. In accordance with this arrangement, individual work carriers can be mechanically programmed to undergo a storage operation, a skip operation, a delayed entry operation or an early pick-up operation, as well as combinations thereof at selected locations along the path of travel of the work carriers.

14 Claims, 18 Drawing Figures

PATENTED SEP 25 1973

INVENTOR.
Giacomo R. Zambon

BY
Harness, Dickey & Pierce
ATTORNEYS

CONVEYING MACHINE WITH PROCESS SELECTOR

BACKGROUND OF THE INVENTION

Conveying machines of the general type to which the present invention is applicable is described in detail in U. S. Pat. No. 3,504,812, granted Apr. 7, 1970, for "Conveying Machine," which is assigned to the same assignee as the present invention. Machines of the foregoing and other similar types are in widespread commercial use for transporting workpieces through a series of work stations, including treating stations such as encountered, for example, in electrochemical, chemical, electroplating or the like processes. Conventionally, machines of this type include a plurality of spaced work carriers, each including a vertically movable carriage thereon from which the workpieces are suspended during the course of their travel through the processing cycle. Suitable transfer means are provided for intermittently advancing the work carriers from one station to the next station and lift means are provided for raising and lowering the carriages and workpieces thereon as may be desired or required such as, for example, to enable them to be transferred above the partitions separating adjoining treating stations.

It frequently becomes necessary, such as in an electroplating process, to concurrently process two or more different types of workpieces, each requiring a total treatment which deviates in one or more areas from that of the other type workpieces. To accommodate such variations in the total processing cycle, machines of the type to which the present invention is applicable have heretofore been provided with various skip, delayed dip, early pick-up and/or delayed set-down mechanisms at selected locations along the processing path in order to enable the workpieces on successive work carriers to undergo predetermined variations in the treatment to which they are subjected. The programming of individual work carriers to undergo preselected variations in the standard processing cycle of the machine has heretofore been achieved by the utilization of various relatively complex electrical systems which are triggered by actuators on a work carrier to cause the work carriers to undergo the desired movement. The complexity of such devices increases rapidly as the number of processing variations increases, whereby the cost of such systems, the difficulty of their maintenance, the problem of altering the program of a work carrier at the completion of each processing cycle and the necessity of employing skilled personnel to effect a programming of the work carriers has somewhat detracted from a more widespread use of such variable processing machines.

The problems and disadvantages associated with prior art type work carrier programming systems is overcome by the present invention in which the selector mechanism is entirely mechanical, assuring substantially maintenance-free operation and also readily enabling the determination of the programmed process of a work carrier by a simple visual inspection off the positions of the selector devices thereon. The economy, durability and simplicity in operation and control of the selector mechanism comprising the present invention enables the attainment of maximum flexibility and versatility in the operation of processing machines with a corresponding improvement in the efficiency and economy of operation thereof.

SUMMARY OF THE INVENTION

The benefits and advantages of the present invention are achieved by a conveying machine consisting of a framework on which at least one work carrier is guidably mounted for travel through a series of work stations. The work carrier includes a carriage which is guidably mounted for vertical movement and is provided with means for supporting workpieces thereon. The machine includes a lift mechanism for engaging and moving the carriage to and from a raised position and a lowered position, as well as transfer means for intermittently advancing the work carrier from one work station to the next work station. The work carrier is provided with a selector mechanism whereby the carriage thereon can be selectively retained in a raised position independently of the lift mechanism so that the workpieces supported from the carriage skip treatment at each such station. The selector mechanism comprises coacting means movable to and from an engaging position for retaining the carriage in a raised position and a non-engaging position. The coacting means are normally biased toward said non-engaging position, whereby the work carrier and the workpieces supported thereon undergo a normal operating cycle. Manually positionable selector means are incorporated in each selector mechanism which are movable to and from an active position and a neutral position. When in the active position, the selector means coact with cams disposed at certain of the work stations for moving the coacting means to the engaging position effecting a retention of the carriage in the elevated position at that station. Accordingly, by an appropriate positioning of the selector means and the cams, any one of a variety of processing cycles can be selected.

In accordance with a preferred embodiment of the present invention, the biasing means are selectively conditionable to and from a first state for yieldably biasing the coacting means toward the engaging position and the second state for yieldably biasing the coacting means toward the normal non-engaging position. When disposed in the first state, the carriage is retained in a raised position throughout its travel along the work stations which corresponds to a storage position of the work carrier. Deactivating means are provided at a station located at the end of the processing cycle at which the carriage on a work carrier is taken out of storage and is lowered to render the arm and the selector mechanism thereon more accessible for programming and for removing and loading new workpieces thereon as the case may be. A neutralizer is also preferably provided at the completion of the processing stations, which is mechanically actuated in mechanical coordination with another machine operation to effect a positioning of all the selector means in the neutral position to facilitate a re-programming thereof for the next operating cycle.

Still further advantages and benefits of the present invention will become apparent upon a reading of the description of the preferred embodiments taken in conjunction with the accompanying drawings.

BRIEF DESCRIPTION OF THE DRAWINGS

FIG. 3 is a fragmentary side elevational view of a selector mechanism mounted on an arm of a carriage of a work carrier;

FIG. 4 is a fragmentary plan view of the work supporting arm and selector mechanism thereon as shown in FIG. 3;

FIG. 7 is a fragmentary transverse sectional view of the mounting of the counterweight on the selector mechanism shaft;

DESCRIPTION OF THE PREFERRED EMBODIMENTS

Figure 1:
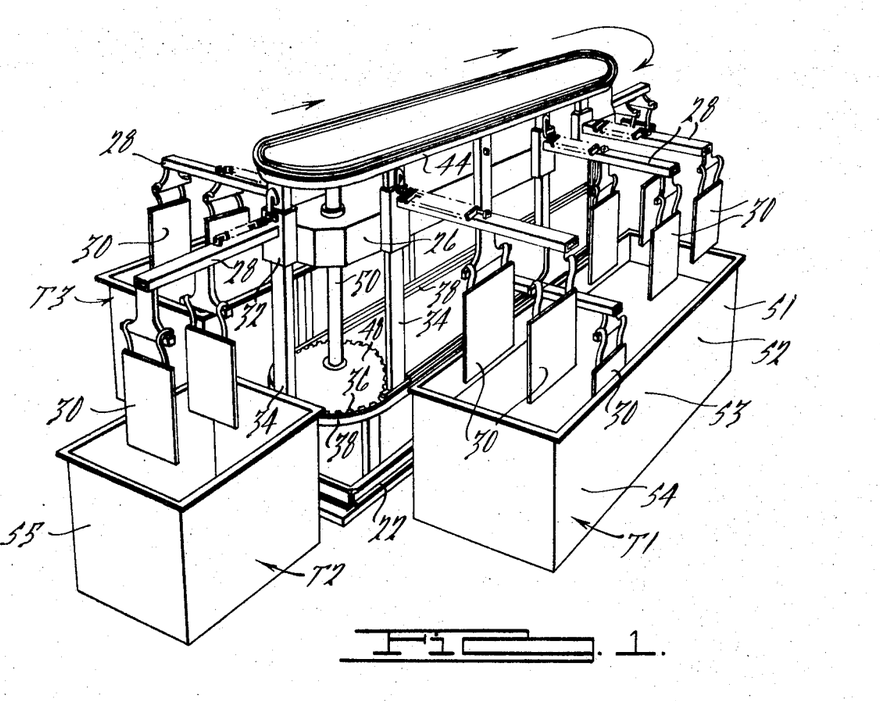
FIG. 1 is a perspective view, partly schematic, of a conveying machine of a general type to which the present invention is applicable.
Figure 2:
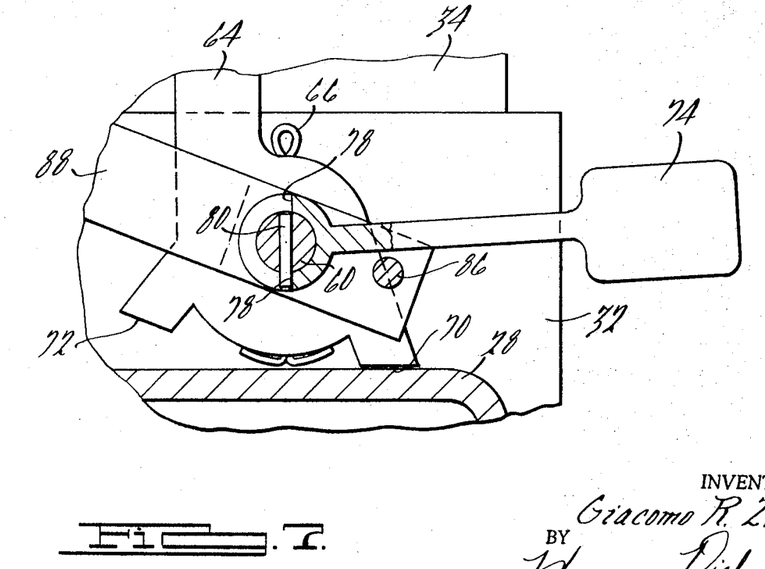
FIG. 2 is a transverse vertical sectional view through a conveying machine of the type shown in FIG. 1.

Referring now in detail to the drawings and as may be best seen in FIGS. 1 and 2, a conveying machine of a type typical of those to which the present invention is applicable comprises a framework including a series of longitudinally spaced upright columns 20 supported on a platform 22 composed of a plurality of interconnected beams. The columns 20 are securely fastened at their upper ends to a longitudinally extending member 24. The longitudinally extending member 24 houses a lift mechanism (not shown) comprised of a plurality of cables connected to the ram of a double-acting fluid-actuated cylinder. The ends of the cables extend downwardly along the columns 20 and are fastened to an elevator chassis 26 which is guidably mounted on the columns for movement to and from a lowered position, as shown in solid lines in FIG. 2, and a raised position, as shown in phantom. The vertical travel of the elevator chassis 26 is effective to raise and lower certain work supporting arms 28 engaged thereby, whereby the workpieces or work racks 30 suspended therefrom are sequentially lowered and raised relative to the treating solutions contained in processing tanks T1, T2 and T3, as shown in FIG. 1.

Figures 13, 14, 15:
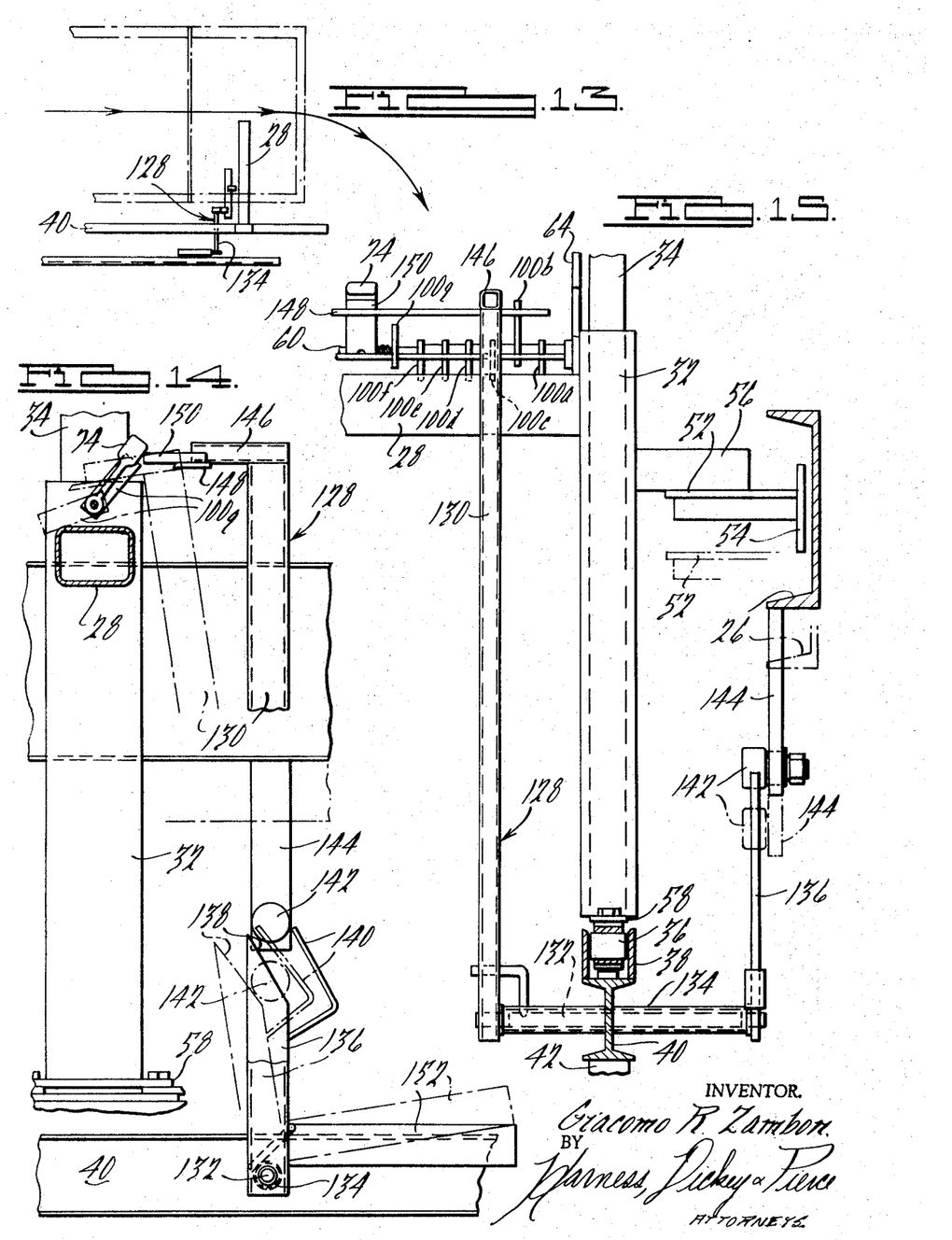
FIG. 13 is a fragmentary schematic plan view of the disposition of a nullifying mechanism on the conveying machine.
FIG. 14 is a fragmentary front elevational view of the actuating mechanism for the nullifying device shown in FIG. 13.
FIG. 15 is a fragmentary side elevational view, partly in section, of the actuating mechanism shown in FIG. 14.

Each of the work supporting arms 28 is rigidly secured to and projects laterally of a carriage 32 comprising a tubular member slidably and guidably disposed around an upright guide member 34 having its upper and lower ends connected to a roller chain 36 which extends around the entire periphery of the machine. The lower roller chain 36, as best seen in FIGS. 1, 2 and 15, is guidably disposed within a U-shaped track 38 which is supported on a longitudinally extending I-beam 40 that extends along the straight side sections of the machine. The I-beam 40 itself is supported at longitudinally spaced intervals by stanchions 42 which are rigidly affixed at their lower ends to the beamed platform 22. The upper roller chain 36 similarly is disposed in guided relationship within a track 44 as may be best seen in FIGS. 2 and 3, which in turn is affixed to the underside of cross members 46 that are secured to the columns 20. The upper and lower roller chains 36 are supported on sprockets 48 mounted on shafts 50 at each of the turn-around end sections of the machine. In accordance with the foregoing arrangement, an intermittent advancement of the roller chain or an advancement of one or a series of work carriers effects a corresponding advancing movement of the remaining work carriers through the interconnected relationship of the roller chains.

Intermittent advancement of the work carriers through the several treating stations can be achieved, for example, by a motor (not shown) drivingly coupled to one of the shafts 50 for effecting an intermittent advance of the roller chain and each of the work carriers connected thereto. Alternatively, an intermittent advancement of the work carriers can be achieved by the coacting engagement of a lift pad 52 affixed to a longitudinally reciprocable plate 54 mounted along each side surface of the elevator chassis 26 which is adapted to coact with an engaging member 56 affixed to and projecting rearwardly of each carriage 32. Accordingly, longitudinal reciprocation of the plate 54 on the chassis (FIGS. 2 and 11) is operative to effect a corresponding advancing movement of those work carriers engaged by the lift pads thereon which in turn are operative through the interconnecting relationship of the roller chains to impart a corresponding advancing movement to the non-engaged interconnected work carriers. In any event, the normal machine operating cycle is comprised of a descending movement of the elevator chassis to effect immersion of the workpieces supported on the work carriers for a preselected time period, whereafter the elevator chassis is again raised and upon attaining the fully raised position, the work carriers are advanced to the next station at which the elevator chassis again descends. The elevator chassis as its approaches the fully lowered position (FIG. 15) moves downwardly so that the lift pad 52 on the reciprocable plate 54 becomes disengaged from the engaging member 56 on the work carrier enabling a retraction of the plate to a position in which the lift pads are disposed inn vertical lifting alignment with the next succeeding work carrier engaging members. When in the fully lowered position, the carriage 32 is disposed with its lower end seated against a horizontal flange 58 affixed to the upright guide member. The retraction of the reciprocable plate occurs during the down dwell period of the elevator chassis at which time the workpieces are immersed in the treating solution such as an electroplating solution. The up and down movement of the elevator chassis, the reciprocating movement of the plate 54 and the transfer stroke of the work carriers are coordinated by suitable position limit switches (such as chassis down position limit switch LS1 in FIG. 2) and a chassis down dwell cycle timer, which prevent initiation of the next operating cycle until the machine has fully completed its prior movement. Further details of the specific structural features and operating characteristics of the conveying machine as hereinabove described are fully disclosed in U. S. Pat. No. 3,504,812, which disclosure is incorporated herein by reference.

The machine illustrated in FIG. 1 is of the so-called turn-around type in which the work carriers are advanced in a closed circuit or loop as defined by two straight side sections interconnected at their ends by arcuate turn around sections. It will be understood that the selector mechanism of the present invention is also applicable to conveying machines of the straight line type, as well as modifications and combinations thereof.

As previously mentioned, it is frequently desirable or necessary that conveying machines of the type heretofore described be provided with means for varying the process cycle such that the workpieces on successive work carriers can undergo treatments deviating from the normal machine processing cycle. A further feature which enhances machine start up and shut down is a storage feature whereby the arms at the completion of a day's or a week's run can be placed in a raised storage position in which they remain throughout the course of their travel through the treating stations until the last workpieces are removed from the supporting arms. Upon the following machine start up, the arms are progressively taken out of storage and are loaded with workpieces to initiate a new processing run.

Among feasible variations in the normal or standard processing cycle, so-called "skip" operations are perhaps the most typical. In a skip operation, a work carrier is retained in an elevated position over one or a plurality of adjoining or spaced treating stations such that the workpieces on that work carrier skip treatment at those stations. Typical of a skip operation is the omission of one or more cleaning tanks such as an anodic cleaning station in the pretreatment section of an electroplating process.

In addition to a skip operation, so-called "early pick-up" or "delayed set-down" process variations can also be included along various sections of the treating stations. In the early pick-up or delayed set-down variation, the work carriers are in the lowered position for only a selected portion of an aligned series of treating stations, whereby a controlled reduction in the total duration of treatment time is attained. Typical of such a processing variation is in the electrodeposition of a metal plating on workpieces requiring different plating thicknesses. Under such circumstances, a multiple-station plating tank is provided which is capable of applying the maximum required plating thickness. Those parts requiring a controlled lesser plating thickness are subjected to a corresponding proportional reduction in total plating time either by a delayed setdown, i.e., by skipping the first or first section of the multiple-station tank, or alternatively, by an early pick-up, whereby after entry at the first station, the work supporting arm is withdrawn or picked up early at an intermediate station of the multiple-station tank, thereby skipping the remaining treating stations.

Frequently a large variety of different parts are concurrently processed, requiring the use of various combinations of single station and multiple station skips, delayed entries and early pick ups of selected work carriers to attain the desired treatment deviations from that provided by the standard processing cycle of the machine. Such variations can simply and effectively be attained by the selector mechanism of the present invention which may be installed on one or more or all of the work carriers of a machine providing a completely mechanical control for routing the work carriers so equipped through a processing cycle. It will be understood that the selector mechanism as herein described, while being particularly applicable to side arm type machines as shown in the drawings, can also be incorporated on any one of a variety of work carriers which are adapted to be intermittently advanced along a processing path and are sequentially raised and lowered during the course of their travel.

Figure 5:
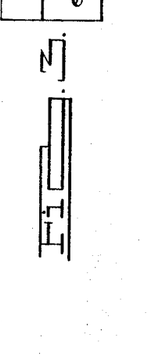
FIG. 5 is a fragmentary end elevational view, partly in section, of the selector mechanism as shown in FIG. 4 with the counterweight disposed in the storage biasing position.

The selector mechanism, as may be best seen in FIGS. 3–9, inclusive, comprises a shaft 60 mounted above a work supporting arm 28 having its inner end rotatably journaled in an aperture formed in the carriage 32 and its outer end in an upstanding bearing bracket 62. An engaging hook 64 is affixed on the shaft 60 adjacent to its inner end and is pinned such as by means of a pin 66 to prevent relative motion between the shaft and hook. The shaft and hook are rotatable between an engaging position, such as shown in solid lines in FIG. 3, and a non-engaging position, as shown in phantom. When in the engaging or upright position as shown in FIG. 5, the hook is disposed in vertical alignment above a lug 68 rigidly affixed to and projecting outwardly of the upright guide member 34, whereupon a lowering of the carriage by the elevator chassis causes a retention of the carriage in a raised position. When disposed in the non-engaging position, as shown in solid lines in FIG. 6, the engaging portion of the hook 64 is disposed out of vertical alignment with the lug 68 such that the downward travel of the carriage is unimpeded.

Figures 5, 6, 8:
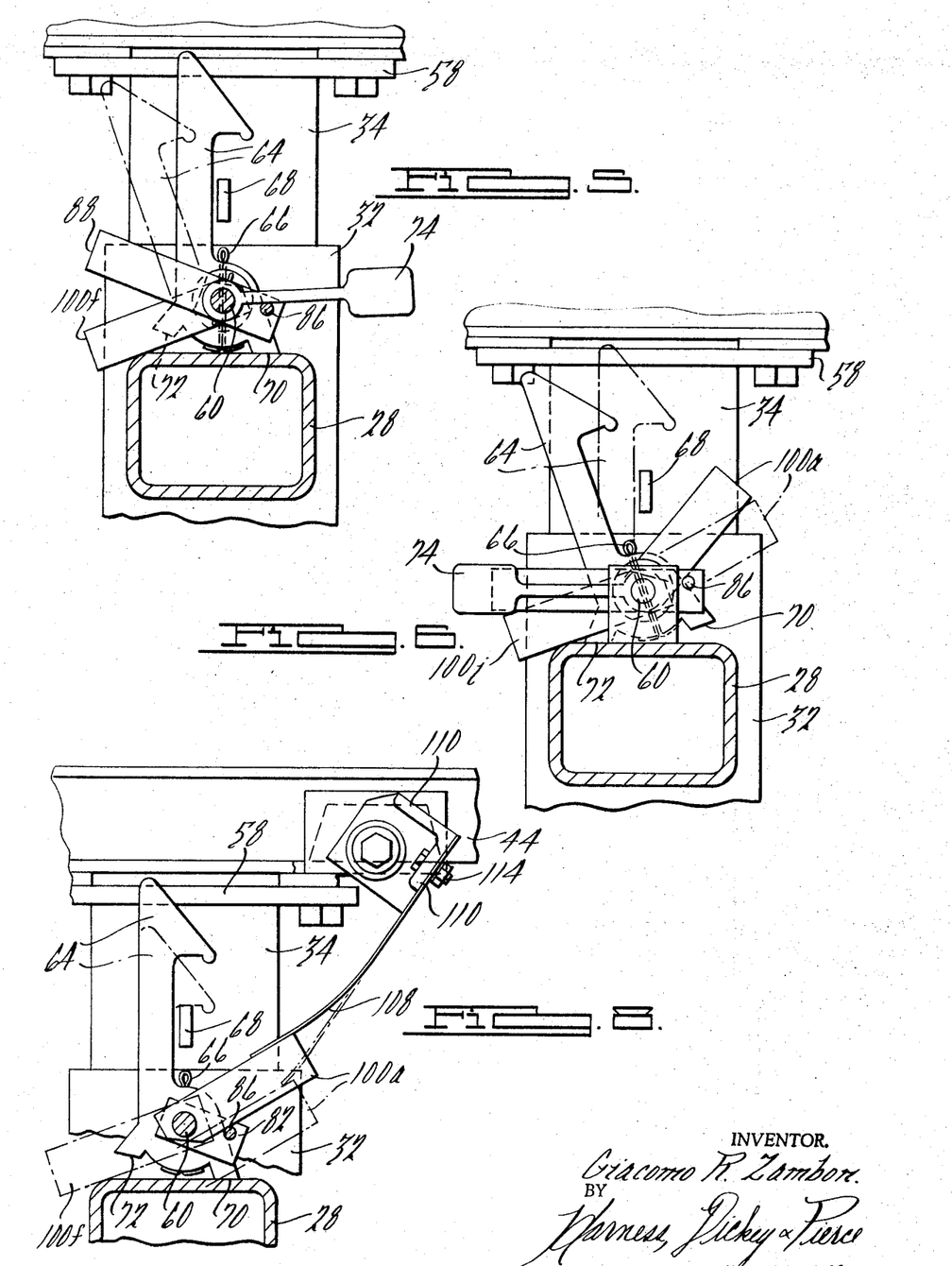
FIG. 6 is a fragmentary end elevational view, partly in section, of the selector mechanism as shown in FIGS. 3 and 4 with the counterweight disposed in a position to bias the engaging hook toward the non-engaging position.
FIG. 8 is a fragmentary side elevational view, partly in phantom, illustrating the cooperative relationship between a cam spring and a selector lever disposed in the active position for retaining a carriage in a raised position.

The engaging hook 64, as best seen in FIGS. 5 and 6, is formed with a first stop 70 which is adapted to be disposed in abutting engagement against the upper surface of the supporting arm when the hook is rotated to the engaging position and a second stop 72 adapted to be disposed in abutting contact against the upper surface of the work supporting arm when the engaging hook attains the non-engaging position. The stops 70, 72, accordingly, control the angularity of rotation of the selector shaft and the engaging hook thereon.

The engaging hook 64 and the shaft 60 are continuously urged toward one of the two positions by means of a biasing device, such as a counterweight 74, mounted at a position about midway along the shaft 60. The counterweight, as best seen in FIG. 7, is formed with a recess 76 separating two bosses which encircle the shaft 60 and which terminate in V-shaped shoulders 78 disposed approximately 180° from each other. A stop pin 80 is affixed to the shaft and projects outwardly of the lower portion thereof and is adapted to engage either of the two shoulders 78 depending on whether the counterweight is in a storage position, as shown in solid lines in FIGS. 5 and 7, or in a non-storage position, as shown in FIG. 6. The coaction between the stop pin 80 and shoulder 78 transmits the torque exerted by the eccentric disposition of the counterweight to the shaft, effecting a turning thereof in the appropriate direction to place the engaging hook in the engaging or non-engaging position as the case may be.

A pair of pivot blocks 82, one disposed adjacent to the engaging hook 64 and the other spaced outwardly of the counterweight 74, are affixed to the shaft 60, such as by means of pins 84. The pivot blocks 82 are apertured for receiving a rod 86 which passes therethrough and extends for substantially the entire length of the shaft 60 in spaced substantially parallel relationship. A storage finger 88 is affixed on the shaft 60 such as by means of a pin 90 and also is apertured at its projecting end for receiving the rod 86. The storage finger 88 is operative, as may be best seen in FIGS. 9 and 10, to effect an arcuate pivoting movement of the engaging hook from the engaging position with the counterweight disposed in the storage position to a non-engaging position enabling the carriage to descend from a raised storage position to a lowered position.

Figure 9:
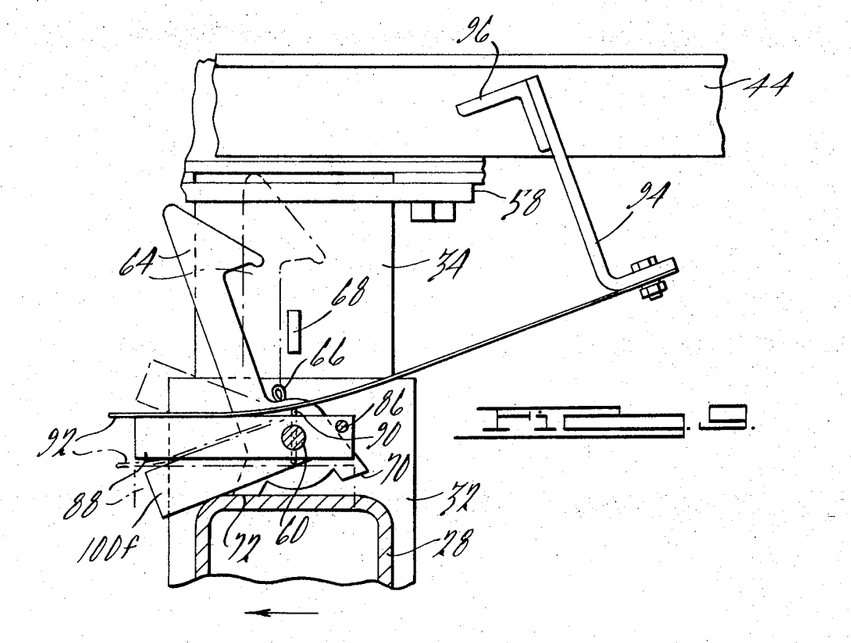
FIG. 9 is a fragmentary side elevational view, partly in phantom, illustrating a cam spring disposed in pivoting coacting relationship with a lever on the selector shaft for taking the work carrier out of storage.
Figure 10:
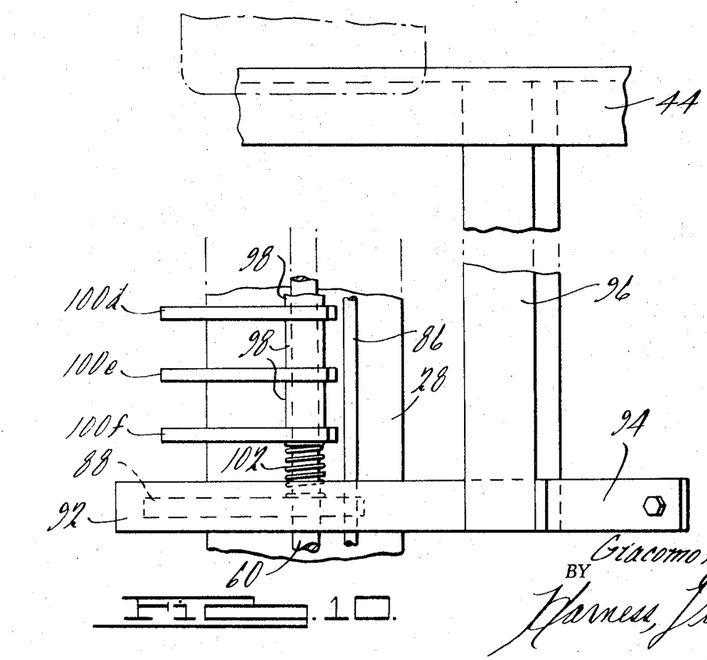
FIG. 10 is a fragmentary plan view of the disposition of the cam spring and selector lever as shown in FIG. 9.

As shown in FIGS. 9 and 10, a resilient cam or leaf spring 92 is affixed to the end of an L-shaped bracket 94 which is secured to a laterally extending angle iron member 96 having its inner end affixed to the upper track 44. The leaf spring 92 is disposed in a downwardly inclined trailing position and in lateral alignment with the storage finger 88 on a work carrier moving along the machine framework. The coaction between the trailing end of the leaf spring and upper surface of the finger in response to the advancing movement of a work carrier into position adjacent to the resilient cam 92 effects a pivoting movement of the shaft and engaging hook in opposition to the biasing force of the counterweight disposed in the storage position to effect a movement of the hook and storage finger from the positions as shown in phantom in FIG. 9 to the positions as shown in solid lines. In that position, when the elevator chassis thereafter moves downwardly, the resilient deflected end portion of the leaf spring 92 maintains contact against the end of the storage finger for a vertical distance sufficient to assure clearance of the end portion of the engaging hook and the lug 68 on the upright guide member. Upon further descending movement of the elevator chassis, a release of the storage finger by the leaf spring 92 occurs whereupon the shaft and engaging hook are again moved by the counterweight to the engaging position. Upon attaining the fully lowered position, the selector mechanism is readily accessible for a re-programming or a nullification of the setting of the selectors thereon as may be desired. If the counterweight remains in the storage position, the work carriage, upon its next ascending movement, will again be placed in a storage position for the balance of its travel along the treating stations until it again approaches a station usually located after the last processing station to again effect a take-out from storage.

In addition to the foregoing, the selector mechanism also incorporates a plurality of selector flippers or levers which have been designated 100a through 100j, respectively. These selector flippers are movable from a neutral or inactive position, as shown in solid lines in FIGS. 3 and 4, to an active position angularly spaced therefrom, such as shown in solid lines in FIG. 6. When in the neutral position, the flipper fingers simply rest with their side edges supported on the work supporting arm. When in the active position, the selector fingers are disposed with their side edges against the rod 86 which serves as a fulcrum for effecting rotation of the shaft and the engaging hook in a clockwise direction as viewed in FIG. 6 in response to the imposition of a clockwise torque to the selector finger effecting a movement thereof from the position as shown in solid lines to the position shown in phantom in which the engaging hook has been moved to the engaging position.

The number of selector flippers can be varied in accordance with the size of the machine and the process variations required. The selector flippers are mounted in longitudinally spaced intervals along the shaft 60 and are maintained in appropriate spaced relationship by means of tubular spacers 98 which are preferably keyed or otherwise affixed against rotation on the shaft. A coil spring 102 is disposed between the storage finger 88 and flipper 100f and a coil spring 104 is disposed between a washer 106 positioned adjacent to the bearing bracket 62 and the selector flipper 100j in order to maintain the selector flippers and tubular spacers in firm abutting relationship.

As best seen in FIGS. 3 and 8, a camming coaction between a selector flipper and a cam spring 108 is effective to cause a movement of the engaging hook from a non-engaging position to an engaging position and to retain the engaging hook in the engaging position during the initial descending movement of the elevator chassis as indicated in phantom in order that the work carriage will be retained in the elevated position at that station. It will also be observed that an operation of the selector mechanism requires not only the disposition of a selector finger flipper in the active position, but also the presence of a cam spring 108 at a station in appropriate position to engage the activated selector flipper. Accordingly, the number of stations at which the work carrier is retained in an elevated position in response to one particular selector flipper being positioned in the active position is established by the number of cam springs 108 that are employed along the work stations of the machine which are disposed in alignment with that particular selector flipper. For this purpose, a laterally extending angle iron support 110 is attached such as to one side of the upper track 44 and is provided with a plurality of apertures 112 in one flange thereof to which the cam springs 108 are removably attached by means of fasteners 114. With the counterweight in the storage position, the engaging hook will be continuously biased toward the engaging position, whereby the work carriage will be retained in the raised position regardless of the position of the selector flippers and spring cams along the work stations. The selector flippers and spring cams are effective only when the counterweight is disposed in the non-storage position.

In accordance with the selector mechanism as hereinbefore described, a selective programming of one work carrier to undergo a skip operation of a single station, such as station S1 in FIG. 1, is achieved by placing the counterweight 74 in the non-storage position (FIG. 6), moving a selector flipper, such as 100a (FIG. 3) from the neutral to the active position and locating a cam spring 108 above station S1. Accordingly, the engaging hook will be moved to the engaging position in response to the advancement of the work carrier into station S1, effecting a retention of the carriage in the raised position. In a similar manner, all of stations S2, S3 and S4 of tank T1 can be skipped by locating cam springs at each such station in coacting alignment with the activated flipper 100a.

Figure 11:
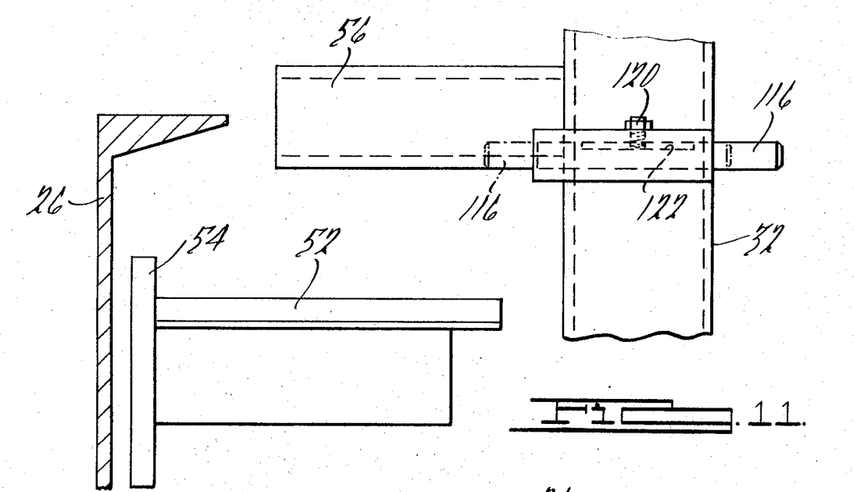
FIG. 11 is a fragmentary side elevational view of the selector slides on a work carriage for engagement with lift pads on the elevator chassis to provide an early pick-up or delayed set-down operation.
Figure 12:
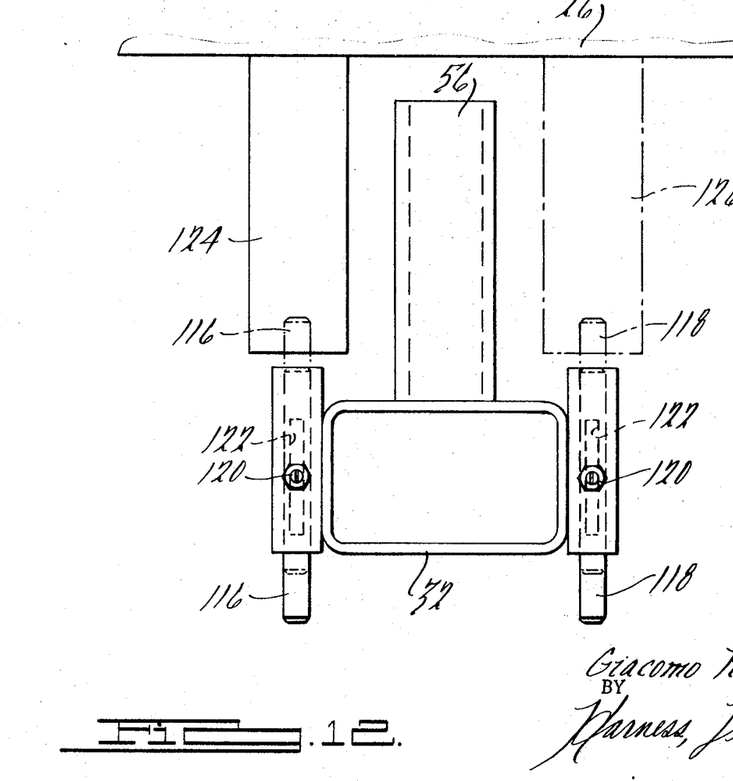
FIG. 12 is a fragmentary plan view of the selector slide and lift pad arrangement shown in FIG. 11.

In order to provide for a delayed set-down or an early pick-up operation, in which the work carrier skips treatment in one or more stations of a multiple-station tank, the work carriers are provided with at least one selectively positionable engaging shaft, such as shafts 116 and 118 as best seen in FIGS. 11 and 12, which are shiftable from an inactive position, as shown in solid lines, to an active or engaging position, as shown in phantom. Retention of the engaging shafts in the appropriate active or inactive position is achieved by a resiliently biased detent 120 disposed in bearing engagement in a flat or groove 122 formed along the upper surface of each shaft, preventing inadvertent shifting thereof from a preset position.

The engaging shaft 116, when disposed in the engaging position, is adapted to project in overlying lifting engagement with a lift pad 124 projecting laterally of the reciprocable plate 54 on the elevator chassis, assuring engagement of that work carrier when disposed at that work station. Similarly, the engaging shaft 118, as shown in FIG. 12, is adapted to cooperate with a lift pad 126, as shown in phantom, when disposed in the engaging position at a station at which the lift pad 126 is located. Only one engaging shaft, such as the shaft 116, and only one corresponding lift pad, such as the lift pad 124, is necessary although two have been shown for the purpose of illustrating a delayed set-down or early pick-up operation at two stations of the multiple-station tank T1.

In accordance with the normal processing sequence, the work carrier arms as shown in FIG. 1 are lowered at station S2 and remain in the lowered position until they arrive at station S4, at which they are again engaged by a lift pad on the elevator chassis and are moved to a raised position in order that they can be transferred to a location above tank T2.

In the situation where it is desired that the workpieces on a work carrier are to undergo a delayed set-down operation in treating tank T1 encompassing stations S2–S4, the selector mechanism is activated by positioning an appropriate selector flipper to the active position. In anticipation of such a process variation, a cam spring is disposed at station S2 for the purpose of coacting with the activated selector flipper to effect a retention of the work carriage in a raised position at station S2 independently of the elevator chassis. It is also necessary that an engaging pin, such as the engaging pin 116, on the work carriage (FIG. 12) is moved to the active engaging position and that in anticipation of such a delayed set-down process deviation, a lift pad, such as the lift pad 124 (FIG. 12), is provided on the reciprocable plate for reciprocation between stations S2 and S3.

In accordance with the foregoing arrangement, the programmed work carrier is lifted from the down position at station S1 in the usual manner by a lift pad on the reciprocable plate and thereafter is transferred upon attaining the fully elevated position while still supported on the lift pad to a position above station S2. During the transfer movement of the carriage into station S2, the selector flipper thereon reacts with the spring cam at station S2, whereby the engaging hook of the selector mechanism is moved to the engaging position in a manner as previously described in connection with FIG. 8. At the completion of the transfer movement, the elevator chassis is lowered and the work carriage is retained by the engaging hook in the raised position above station S2 and undergoes a skip of that station.

Upon attaining the fully lowered position, the reciprocable plate on the elevator chassis is fully retracted, whereby the lift pad 124 (FIG. 12) is retracted to a position in vertical lifting alignment beneath the activated pin 116 (FIG. 12) of the work carrier undergoing the skip operation at station S2. Accordingly, as the elevator chassis is again raised, the lift pad 124 engages the pin 116 just prior to completion of the ascending movement of the elevator chassis, whereby the work carriage is now supported by the elevator chassis and the engaging hook is moved in vertical clearance relative to the lug. As the work carrier is next transferred toward station S3, or toward the left as viewed in FIG. 8, the spring cam releases the selector flipper, whereby the counterweight pivots the engaging hook to the non-engaging position. The work carriage remains supported in the raised position during the transfer movement by the lift pad 124. Since no cam spring has been provided at station S3 for coaction with the activated flipper, the engaging hook remains in the non-engaging position. Upon attaining the position above station S3, the elevator chassis is again lowered, whereby the work carrier moves downwardly and is immersed in the middle station of the multiple station treating tank and undergoes appropriate treatment at stations S3 and S4.

In an early pick-up operation, utilizing the similar presetting of the engaging shaft 118 and a different selector flipper, a work carrier, upon being advanced to a position above station S2, is lowered in accordance with the standard processing cycle and after a prescribed down dwell period, during which a retraction of the reciprocable lift plate has taken place and the elevator chassis has again been raised, is advanced while in a fully lowered position to a position at station S3. Upon completion of the transfer movement, the elevator chassis is again lowered, and upon attaining the fully lowered position, the reciprocable lift pad is again retracted. Upon being retracted, the lift pad 126 reciprocable between stations S3 and S4, becomes positioned beneath the engaging shaft 118 disposed in the engaging position (FIG. 12) and the work carrier at station S3 is accordingly raised to the elevated position in accordance with the programmed early pick-up cycle, skipping further treatment in tank T1. The work carrier, during the ascending movement and during the subsequent transfer stroke, remains supported by the lift pad 126. Upon being transferred into position above station S4, the selector flipper disposed in the active position of the early pick-up work carrier coacts with a spring cam (FIG. 8) effecting a rotation of the engaging hook to the engaging position, whereby the work carrier is retained in an elevated position above station S4, skipping further treatment at that station. Additional cooperating pairs of engaging shafts and lift pads can be incorporated in the machine such as the engaging shaft 118 and lift pad 126, thereby providing for early pick-up or delayed set-down operations at still other stations along the processing cycle including different locations along the same multiple-station treating receptacle.

The positioning of the engaging shafts 116, 118; the selector flippers 100a–100j; and the counterweight 74 between the active and inactive positions can be achieved manually or remotely at the initiation of a processing cycle and similarly can be moved to a neutral position in a similar manner at the conclusion of an operating cycle. In accordance with a preferred embodiment, all of the selector flippers are moved to a neutral position and the counterweight to the non-storage position by a nullifying or neutralizing mechanism, as best seen in FIGS. 13–15. As schematically shown in FIG. 13, the nullifying mechanism indicated at 128 is preferably mounted at a point convenient at the output end of the processing stations and is operable for manually coacting with the selector flippers and counterweight after the elevator chassis has descended and in response to the last portion of descending movement thereof. The nullifying mechanism, as best seen in FIGS. 14 and 15, comprises a layer 130 supported by a transverse shaft 132 rotatably journaled in a sleeve 134 affixed to and projecting to each side of the I-beam member 40 comprising a portion of the machine framework. A pivot arm 136 formed with an angular cam surface 138 is securely affixed, such as by pinning, to the opposite end of the shaft 32 and is formed with a cam shoe 140 disposed parallel to the cam surface 138 defining a cam slot. The upper open end of the cam slot is disposed in vertical alignment with a roller 142 affixed to an actuator arm 144 affixed to and depending from the underside of the elevator chassis 26.

The vertical positioning of the pivot arm relative to the roller 142 is such that the roller enters the upper end of the cam slot at a point after the work carriage has attained the fully lowered position and is seated against the horizontal flange 58 of the upright guide. Thereafter, the remaining downward movement of the elevator chassis, as indicated in phantom in FIGS. 14 and 15, imposes a corresponding angular camming movement of the pivot arm which, through the cross shaft 132, effects a corresponding angular movement of the lever 130. A bracket 146 is affixed to the upper end of the lever 130 to which a laterally extending blade 148 is secured and on which a cam block 150 is affixed at a position intermediate of the length thereof. The cam block 150 is disposed in lateral alignment with the counterweight, while the blade extends laterally along the length of the various selector flippers along the selector mechanism.

It will be apparent from the arrangement illustrated in FIG. 14 that the pivoting movement of the nullifying mechanism and the blade and cam block thereon from the inoperative position, as shown in solid lines in FIG. 14, to the operative position effects a corresponding pivoting movement of the selector flippers and counterweight to the inactive positions. A retention of the nullifying mechanism in a normal inoperative or vertical position, as shown in solid lines in FIG. 14, is attained by a counterweight arm 152 affixed to the lower end and projecting longitudinally of the lever 130.

A nullification of the engaging shafts 116, 118 (FIG. 12) can be achieved by a similar lever arrangement operating laterally relative to the path of travel of the work carriers and operable upon movement of a rearwardly inclined position to an upright position to engage and move the shafts outwardly to an inactive position.

Figures 16, 17, 18:
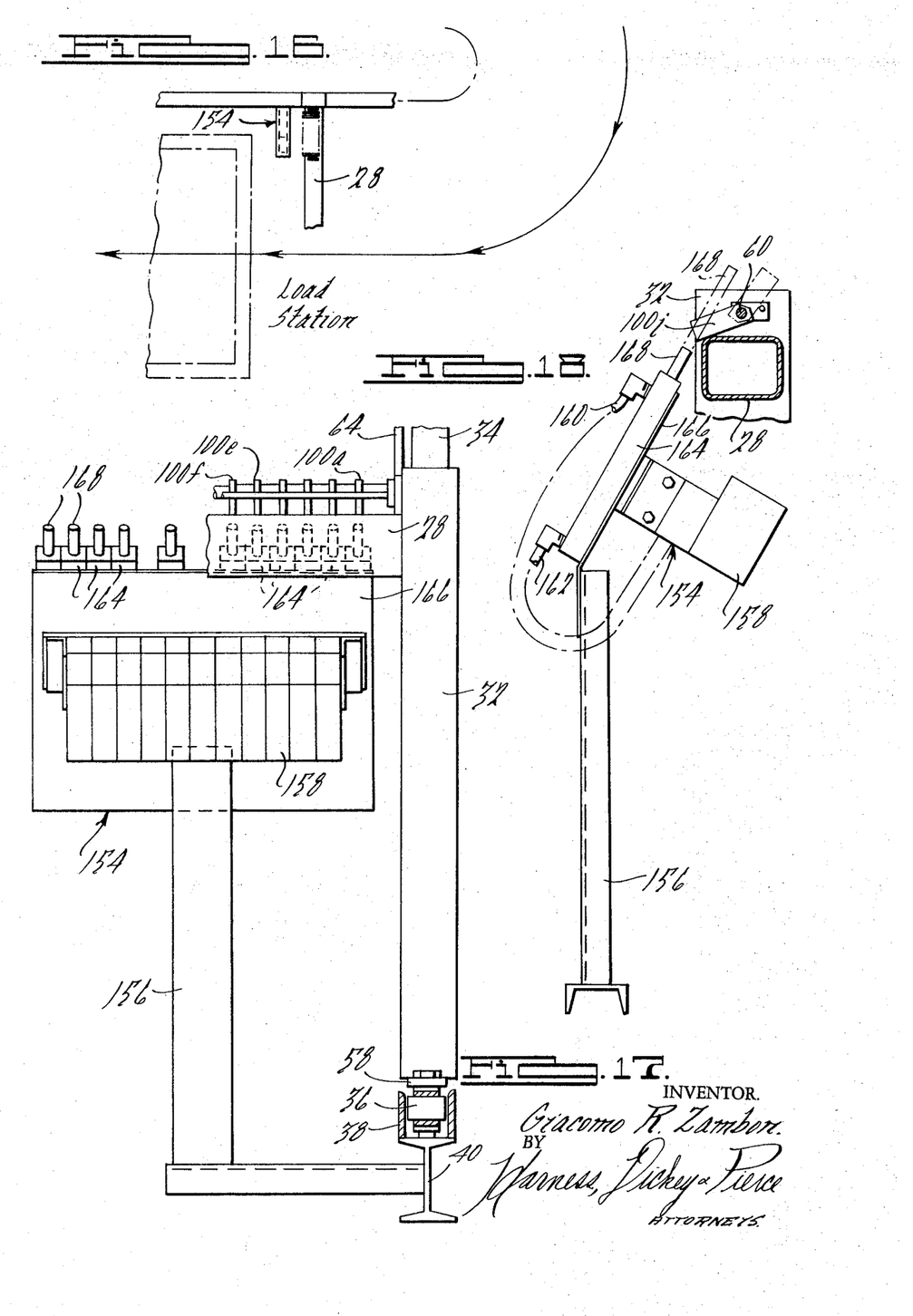
FIG. 16 is a fragmentary schematic plan view of the disposition of the selector actuator for effecting a remote programming of the selector mechanisms on the work carriers.
FIG. 17 is a fragmentary side elevational view of the selector actuating mechanism.
FIG. 18 is a front elevational view, partly in phantom, illustrating the selector actuator disposed relative to the selector mechanism on a work carrier.

The positioning of the selector flippers and the counterweight to the active positions can conveniently be achieved by operators at a load station, such as shown in FIG. 16, after the workpieces have been loaded on the work supporting arm. In accordance with a preferred practice of the present invention, a remotely operable process selector actuator mechanism 154 is disposed at the load station which is adapted to be operated remotely or automatically, as may be desired, to effect an appropriate positioning of the counterweight and selector flippers consistent with the nature of parts loaded on the work carrier. The selector mechanism, as best seen in FIGS. 17 and 18, comprises an L-shaped frame 156 affixed to and projecting laterally of the I-beam member 40, to the upper end of which a solenoid console 158 is mounted. The solenoid console 158 comprises a plurality of independently and remotely actuatable solenoid valves, each of which is interposed in supply lines 160, 162 for supplying a pressurized fluid, such as air, to cylinders 164 secured to the upper surface of a mounting plate 166. Each of the cylinders 164 is provided with a piston rod 168 which is movable to and from a retracted position, such as shown in solid lines in FIGS. 17 and 18, to an extended or projected position, as shown in phantom, and in which position the end portion thereof is operative to pivot a selector flipper from an inactive position to the active position. The energization of selected ones of the solenoid valves and a corresponding actuation of the cylinders 164 can be achieved individually at a station remote from the load station or by a programming device for energizing a prescribed combination of cylinders and the selector flippers in alignment therewith consistent with either one of a plurality of processing cycles available.

While it will be apparent that the invention herein described is well calculated to achieve the benefits and advantages as hereinabove set forth, it will be appreciated that the invention is susceptible to modification, variation and change without departing from the spirit thereof.

What is claimed is:

1. A conveying machine comprising a framework having at least one work carrier guidably mounted thereon for travel through a series of work stations, said work carrier including a frame and a carriage guidably mounted for vertical movement on said frame and incorporating workpiece supporting means thereon, lift means for moving said carriage to and from a raised position and a lowered position, transfer means for advancing said work carrier along said framework, and selector means on said carrier for selectively retaining said carriage thereon in a raised position independently of said lift means, said selector means comprising an elongated member mounted on said carriage for pivoting movement about its longitudinal axis and extending substantially transversely of the direction of travel of said carrier, coacting means on said elongated member and movable thereby to and from an engaging position with said frame for retaining said carriage in said raised position and a non-engaging position, biasing means for yieldably biasing said elongated member and said coacting means thereon toward said non-engaging position, a plurality of selector means arranged in transversely spaced relationship along said elongated member and individually selectively positionable in an active position and a neutral position, and cam means at a work station operatable to contact selected ones of said selector means when disposed in said active position for pivoting said elongated member and moving said coactive means to said engaging position in opposition to said biasing means in response to movement of said carriage.

2. The conveying machine as defined in claim 1, wherein said biasing means are selectively conditionable to and from a first state for yieldably biasing said coacting means toward said engaging position and a second state for yieldably biasing said coacting means toward said non-engaging position, said biasing means when in said first state operable to retain said carriage in said raised position during its travel through the work stations providing a storage operation.

3. The machine as defined in claim 2, wherein said biasing means comprises a counterweight mounted on said elongated member, said counterweight being movably positioned on said elongated member for applying a rotative biasing force thereto in one direction when disposed in said first state and in the opposite direction when disposed in said second state.

4. The machine as defined in claim 2, wherein said selector means further includes a storage flipper operatively associated with said coacting means and a storage cam on said framework operatable to coact with said storage flipper for moving said coacting means to said non-engaging position to take said carriage out of a storage function at a selected location along its path of travel.

5. The conveying machine as defined in claim 1, wherein said cam means are placed at selected work stations for coacting with selected ones of said selector means disposed in said active position.

6. The conveying machine as defined in claim 1, further including remotely actuatable means at one station for positioning selected ones of said selector means in said active position.

7. The machine as defined in claim 6, wherein said selector means comprises a plurality of fingers pivotally mounted on said elongated member and said actuatable means comprises a plurality of independently actuatable laterally spaced actuators disposed in operative alignment with said fingers for effecting a pivoting movement thereof from said neutral position to said active position in response to the actuation thereof.

8. The conveying machine as defined in claim 1, further including nullifying means at a station operable for positioning said selector means in said neutral position.

9. The machine as defined in claim 8, wherein said selector means comprises a plurality of pivotally mounted fingers disposed on said elongated member and said nullifying means is operable in response to actuation thereof for effecting a pivoting movement of any of said fingers from said active position to said neutral position.

10. The machine as defined in claim 8, wherein said nullifying means comprises a pivotally mounted lever including a laterally extending blade thereon adapted to be disposed in coacting alignment with said selector means, said selector means comprising a plurality of laterally spaced pivotally mounted fingers disposed on said elongated member, said lever movable from a clearance position to a coacting position in pivoting contact with said fingers in response to at least a portion of the movement of said lift means.

11. The conveying machine as defined in claim 1, further including selectively positionable engaging means for selectively coupling said lift means to said carriage for effecting vertical movement of said carriage at locations different from those of the normal operating cycle of said machine.

12. The conveying machine as defined in claim 1, wherein said coacting means comprises a lug affixed to said work carrier and an engaging hook mounted on said elongated member and adapted to engage said lug when disposed in said engaging position.

13. The conveying machine as defined in claim 1, wherein said coacting means comprises an engaging hook on said elongated member and a lug on said frame adapted to be engaged by said hook when disposed in said engaging position, said selector means comprises a plurality of fingers pivotally mounted on said elongated member and swingable to and from said neutral position and said active position, said cam means operatable in response to coaction with said selector fingers to effect arcuate pivoting movement of said elongated member and said hook thereon toward said engaging position to retain said carriage in the raised position after said lift means has been lowered.

14. The machine as defined in claim 1, wherein said biasing means comprises a weight positioned eccentrically relative to the axis of pivoting movement of said elongated member for continuously urging said elongated member and said coacting means thereon toward said non-engaging position.

* * * * *